United States Patent Office.

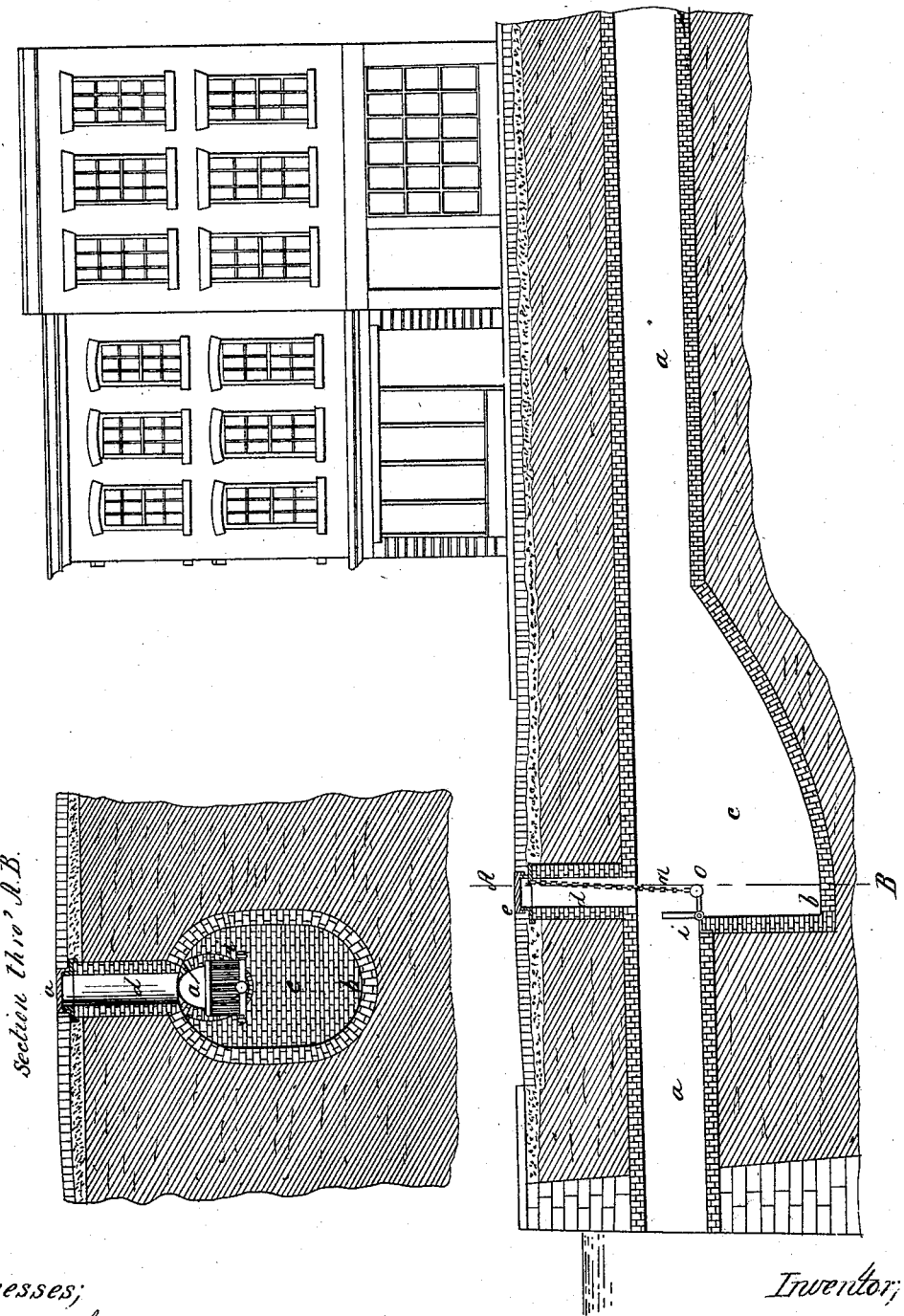

J. BURROWS HYDE, OF NEW YORK, N. Y.

Letters Patent No. 110,366, dated December 20, 1870.

IMPROVEMENT IN UTILIZING SEWERAGE MATTERS.

*The Schedule referred to in these Letters Patent and making part of the same.*

*To all whom it may concern:*

Be it known that I, J. BURROWS HYDE, of the city, county, and State of New York, have invented a new and useful Method for Utilizing and Deodorizing Sewerage and Privy Deposits, Urinal, and the Offal of cities and towns; and I do hereby declare the following to be a full and exact description thereof, reference being had to the accompanying drawings and the letters of reference thereon.

The nature of my invention consists—

First, in constructing a chamber, pocket, or trap, in the sewer-conduit *a* at any convenient point, as at *c*, by depressing its lower surface or bottom to any proper depth; and also, when necessary to do so, by increasing its width beyond the sides of the sewer, the location of the trap being at any proper place for the most effectual gathering of the material.

The shape of the chamber may be varied, but I prefer to construct it so as to be deepest at its forward end, as at *b*, with a gradual ascent from that point to the bottom of the sewer, or curved, as shown in the drawing.

If the chamber be differently shaped it should, in all cases, be deepest at some part by depressing the bottom at that place, for obvious reason.

On this depressed or deepest part of the chamber I construct a vertical shaft, *d*, of proper diameter, from the chamber to the surface of the ground or roadway, where the opening should be closed by a proper cover, as at *e*, which should be easily secured or removable.

In this condition the solid matters that flow along the sewer will sink into and settle in this depressed chamber, while the fluids will pass on to the outlet of the sewer. And, in cases where convenient and necessary, I provide a grating, *i*, of thin strips of wood placed vertically and edgewise to the current, with proper intervals between them, to arrest the floating matters that may pass where the chamber is overflowing with water.

This grating should cover about half the outlet end of the sewer, and be hinged at the bottom, and should be provided with a counterbalance, *o*, to drop the grating inward to the chamber, and clear the interstices of any substance that may collect there and obstruct the water flow.

The grating being held in its proper vertical position by a chain, *n*, having its upper end secured near the top of the vertical shaft to facilitate lowering and lifting and securing the grate.

By this system the more solid matters are not only pocketed and retained from being washed out at the mouth of the sewer, to settle and decompose, evolving most offensive gases, but are saved in a condition for easy removal through the shaft *d*, placed in carts, and treated for fertilizing purposes.

Second, for the more perfectly effecting the desired objects, it is best that this fetid matter should be deodorized; to prevent, as far as possible, the escape of noxious gases from the sewer-pocket, and also when it is being transported in carts, and this I effect as follows:

I prepare ulmine, the fine pulpy portion of peaty matter, by drying and grinding it to powder.

This material I place in the empty chamber to a depth of twelve inches, more or less.

The sewerage matter will readily combine with this ulmine, which is not only a prompt disinfectant, but holds the sulphuretted hydrogen and ammoniacal gases on which it seizes in large volume, and it will not part with them until itself is decomposed.

If at any time on opening the trap disagreeable odors shall be evolved from the chamber, a few inches depth of the powder should be thrown over the surface, and when the material is removed from the chamber and placed in carts for transportation, the surface may be in like manner covered with the ulmine, which will arrest all offensive odors from escaping when passing along the street.

This dry ulmine powder has the property to also utilize the salts and gases of urinal fluid.

It will arrest the escape of ammonia and prevent the urine from decomposing and besides is highly valuable in public urinals, by placing it as described, first, in the empty vessel, and adding afterward, if necessary, as before described.

It will also serve a similar purpose in privy-vaults upon fecal matter, besides preventing it from waste and decomposition, while, at the same time, in all of the described uses or applications its addition not only increases the bulk of the mass, but itself also contributes an essential element of fertilization, which it adds to the other materials for vegetable nourishment.

It also, in all the cases described, furnishes highly useful sanitary benefits, particularly in a crowded population.

When there is an accumulation of fluid in urinals, a weak solution of sulphuric acid in water may be sprinkled over the surface before covering it with the ulmine powder.

It will partially arrest the decomposition of and to a great degree, if not entirely, prevent the escape of unhealthy odors from the offal of slaughter-houses, fish, and other markets, and the carcases of dead animals, if it be admixed with or they be well covered by the described material.

What I claim and desire to secure by Letters Patent is—

1. The construction and use of a sewer-chamber or trap, in the manner and for the purpose described.

2. The use of the described material, in the manner and for the purpose set forth.

J. BURROWS HYDE.

Witnesses:
 THOS. W. MATHER,
 A. H. TAIT.